Feb. 11, 1947.   G. T. RONK   2,415,706
TRANSPORT TRAILER
Filed June 19, 1940   5 Sheets-Sheet 1

INVENTOR.
GEORGE T. RONK
BY Flournoy Corey,
ATTORNEY.

Feb. 11, 1947.  G. T. RONK  2,415,706
TRANSPORT TRAILER
Filed June 19, 1940   5 Sheets-Sheet 2

INVENTOR.
GEORGE T. RONK
BY Flournoy Corey,
ATTORNEY.

Feb. 11, 1947.  G. T. RONK  2,415,706
TRANSPORT TRAILER
Filed June 19, 1940  5 Sheets-Sheet 3

INVENTOR.
GEORGE T. RONK
BY
Flournoy Corey,
ATTORNEY.

INVENTOR.
GEORGE T. RONK
BY
*Flournoy Corey*,
ATTORNEY.

Patented Feb. 11, 1947

2,415,706

UNITED STATES PATENT OFFICE 2,415,706

TRANSPORT TRAILER

George T. Ronk, Cedar Rapids, Iowa

Application June 19, 1940, Serial No. 341,268

21 Claims. (Cl. 280—80)

This invention relates to transport trailers for conveying heavy machinery on the highways and cross-country which could not be borne by the customary type of vehicle. The invention relates more specifically to that type of trailer known as a low platform trailer.

In transporting heavy loads, such as excavating shovels and the like across country, one of the serious problems encountered is that of loading and unloading the machines or other load. While various forms of low platform trailers have been proposed for this purpose, they have not been entirely satisfactory because of the necessity of building heavy ramps to get the load over the front or rear wheels or of loading over the side, which method is very difficult and dangerous, particularly on soft ground.

It is one of the main objects of my invention to provide a low platform trailer in which loading and unloading may be accomplished swiftly and easily from the front or rear, as desired, and on any soil surface firm enough to permit traction.

It is another object of my invention to provide a transport trailer which utilizes its own platform as a loading ramp.

It is another object of my invention to provide a novel, rapid and inexpensive means for loading low platform trailers of either of the types described, either over the front end or over the rear end, according to the construction preferred, on any soil surface firm enough to permit traction.

It is a further object of my invention to provide a stable rolling fulcrum in the axles themselves, whereby the frame may be lowered from the axle, in order that the axle may be removed for loading the frame, whatever the condition of the soil surface.

It is another object of my invention to provide for the rapid removal of either the front or the rear axle in drawbar trailers, whereby the rear or front end of the frame may be loaded by using the platform as a ramp; and to provide for the rapid replacement of the front or rear axle and the raising of the frame to an operative position for transit, without the use of jacks positioned on the ground.

It is still another object of my invention to provide a vehicle of the character described having a very low platform without necessitating the use of special types of low wheels and special types of tires, to thus avoid tire heating difficulties and permit ready replacement from standard wheel and tire stocks.

Another object of my invention is to provide a novel and inexpensive underhung method for supporting either the front or the rear end of the frame on axles, which will render the axles both stable in operation and easily demountable.

Another object of my invention is to provide for the vertical raising and lowering of the frame over the axles or the axle equalizers, to avoid the shifting of the frame or buckling of the jack during the operation.

Still another object of my invention is to provide for raising and lowering of the frame and the cargo by direct suspension, to thus avoid danger from shifting of the frame.

A further object of my invention is to provide for the raising and lowering of the frame by the use of light and portable fluid jacks, working in conjunction with a linkage system, thus avoiding the use of heavy-duty screw jacks with the accompanying manual toil and loss of time.

Another and further object of my invention is to provide mechanism for the use of multiple axles in carrying excessive loads, said mechanism being designed to provide for progress over uneven ground and at the same time adaptable for rapid lowering and raising of the frame, and for detachment and attachment to the load carrying frame.

Still another object of my invention is to provide for spring suspension in demountable axles, whether single or multiple, in conjunction with a simple means for vertical suspension, for lowering and raising of the frame, and to provide for overcoming the problem of spring deflection in the process.

It is a still further object of my invention to provide for a self centering jack support, that will be unaffected by the shifting of the frame or of the axle fulcrum during the raising or lowering of the frame.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims, without departing from the spirit of the invention.

Referring now to the drawings.

Figure 1:
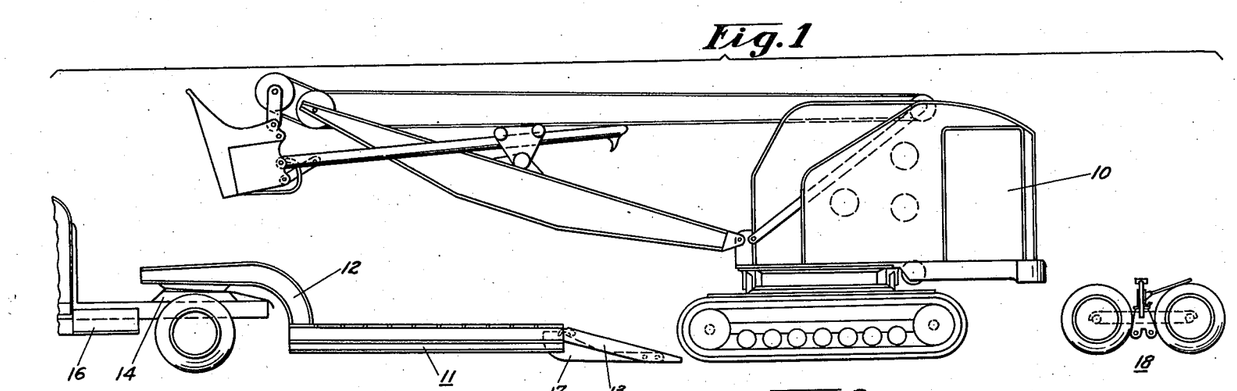
Figure 1 is a view in side elevation illustrating the process of loading an excavating shovel on a trailer constructed according to one embodiment of my invention. The trailer is shown in dismounted position with the rear wheels or truck spaced at a distance from the main part of the trailer to permit the platform thereof to be used as a loading ramp.
Figure 2:
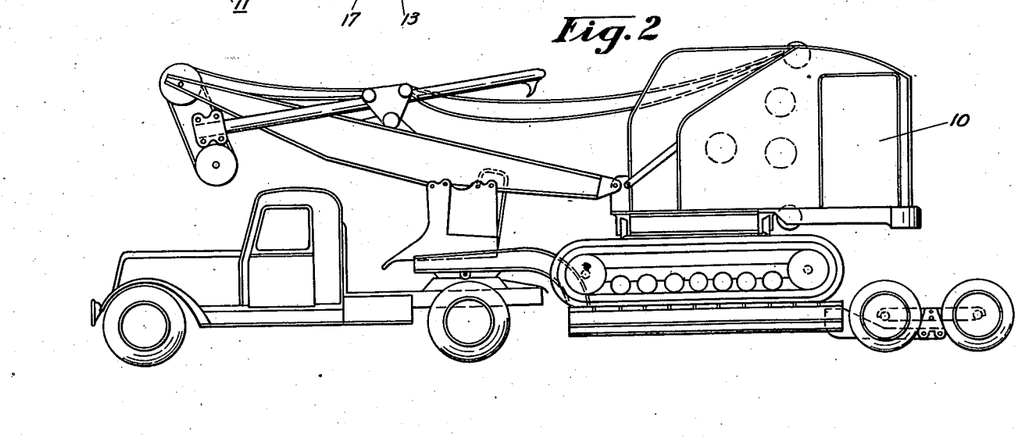
Figure 2 is a view in side elevation of the trailer shown in Figure 1 as it appears when ready for transporting the load on the highway.

Referring now to the drawings:

Figures 1 and 2 are elevational views illustrating more particularly, a general arrangement of the parts of a trailer, constructed according to one embodiment of my invention, and how the trailer is operated in loading and carrying heavy machinery or the like, such as the excavating shovel shown at 10. In this form of the invention I utilize a platform 11, more particularly illustrated in Figures 3 and 4. The platform in this form of the invention has a goose-neck tongue, illustrated at 12, and is provided with one or more small wooden ramps 13 which may be carried along as supplementary equipment.

Referring now particularly to Figure 1, the goose-neck tongue rests on the fifth wheel 14 of a tractor truck 16. It could, of course equally well rest on the fifth wheel of an ordinary front axle of any other wheel structure commonly used in supporting trailers of this character. The rear end of the platform 11 is provided with a pair of heavy levers or lever arms 17 for attaching to and supporting the rear end of the platform from the wheeled structure illustrated generally at 18.

When placing the load on the platform, these lever arms 17 rest on the ground and thus the lift required in getting the load onto the platform is at a minimum. It may readily be understood that the platform is utilized as a sort of tilting table pivoting about the axis of the fifth wheel of the tractor truck, so that, when the lever arms 17 rest upon the ground, the platform affords an inclined ramp up which the load may be easily driven or loaded, and with a minimum of supplementary equipment.

When the load has been properly placed and disposed on the platform, the rear end of the platform is raised, by hydraulic jacks or other suitable means which I will later describe, and attached to the rear wheels, as illustrated in Figure 2. The trailer is then in condition for transporting the load from place to place as desired.

When the destination is reached, the hydraulic jacks are used to lift the strain from the attaching means, the attaching means are disengaged, the rear end of the platform lowered by the jacks, and the load discharged.

I may utilize various devices for raising the rear end or the front end of the trailer as desired, and for supporting the load during transportation of the trailer and load. Some of these forms of axles and hoisting mechanisms are illustrated in the drawings, and it is obvious that these and various other forms of hoisting and supporting mechanisms may be utilized without departing from the spirit and scope of the invention.

Figure 3:
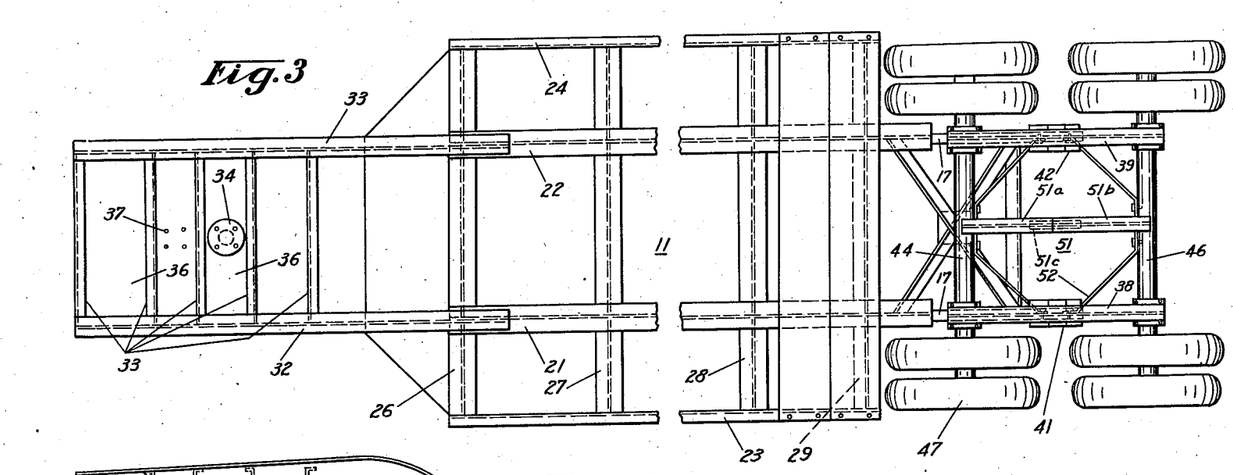
Figure 3 is a plan view of the trailer illustrated in Figures 1 and 2. A portion of the platform has been removed to permit illustration of the remaining parts.
Figure 4:
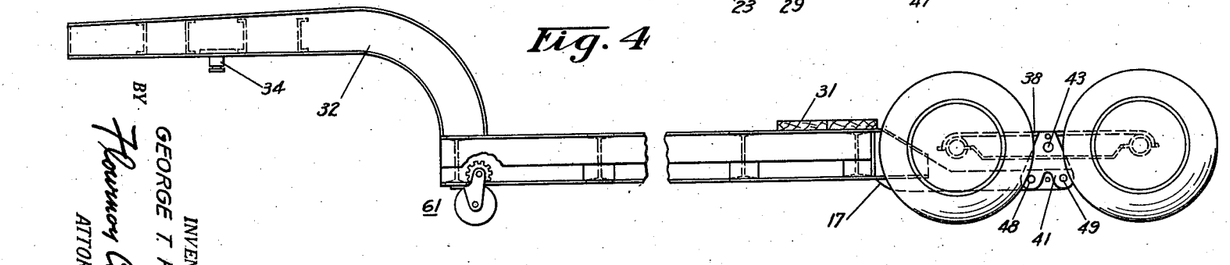
Figure 4 is a view in side elevation illustrating the construction and arrangement of the parts of the device shown in Figures 1, 2 and 3. A portion of the frame has been broken away to illustrate the remaining parts in greater detail.

Referring now more particularly to Figures 3 and 4, I have illustrated one form and perhaps a preferred form of the invention. The platform here shown consists of longitudinal, horizontal frame members 21 and 22 having supplementary longitudinal members 23 and 24 attached to transverse beam members, such as illustrated at 26, 27, 28 and 29. The platform may be covered by planking, as illustrated at 31, or by any other suitable material or load supporting means.

The front end of the platform 11 is supported, in this form of the invention, by a pair of gooseneck beams 32 and 33, which members preferably constitute extensions of the main frame members 21 and 22. Transverse beams 33 are provided for stiffening the structure and for affording supporting means for the fifth wheel king pin 34. This fifth wheel king pin is preferably secured to plates 36 which form the bottom of the goose-neck structure.

I may provide supplementary holes for mounting the king pin, as at 37, for lengthening the wheel base in case it is desired to move the fifth wheel forward for increased loading capacity.

The lever arms 17, previously referred to, are illustrated in these figures, and the ends of these lever arms are supported from the rear axle or rear axles of the trailer by means of equalizer bars 38 and 39. These equalizer bars are pivotally attached to hangers 41 and 42 so that the equalizer bars 38 and 39 may rock on the pins 43 to permit the wheels mounted on the axles 44 and 46 to travel over uneven ground. The tires 47 are mounted on the axles 44 and 46 in accordance with the usual practice.

The hangers 41 and 42 are preferably secured to the lever arms 17 by means of pins 48 and 49, so that, in this form of the invention, the hangers cannot pivot on the lever arms 17.

The front and rear axles are connected by means of a three-part torque beam illustrated generally at 51. This torque beam is formed of the front section 51a, a rear section 51b, and a shaft 51c received in the abutting ends of the sections of the torque beam. It will be noted that the sections of the torque beam may rotate about the axis of the shaft 51c to a degree limited only by the approximately rectangular frame formed by the axles 44, 46, the rocker beams 38 and 39, and also the braces 52.

Braking mechanisms may be mounted on the wheels in accordance with usual practice. It will be apparent that, when the brakes are applied, the torque beam will act as a compensating control. This structure is more particularly described and claimed in co-pending application Serial No. 341,269, filed concurrently herewith, now Patent No. 2,334,037, issued Nov. 9, 1943.

A so-called landing gear, illustrated generally at 61 (Figure 4) supports the forward end of the trailer frame when the trailer is disengaged from the supporting tractor truck. This landing gear may be constructed in accordance with any of the usual methods since it forms no part of the present invention.

As I previously stated, I may practice my invention of a tilting platform either by loading from the rear of the platform, or from the front, as desired, and in Figures 5 to 8 inclusive I have illustrated a structure by which loading of the platform from the front of the trailer may be accomplished. In this form of the invention, the rectangular platform, shown in Figures 1 to 4 inclusive, has been omitted and its function supplied by means of the main frame members 62 and 63 and the cross frame members or supports 64 and 66 which are adapted to fit under the frame of the machine to be carried. In this form of the invention, I may utilize a form of off-set or kick-up support illustrated at 67 in which the rear portion of the frame, indicated at 68, is in a higher horizontal plane than the forward or main portion of the frame. In this structure, the frame members 62 and 63 converge toward the forward end of the trailer.

Figure 5:
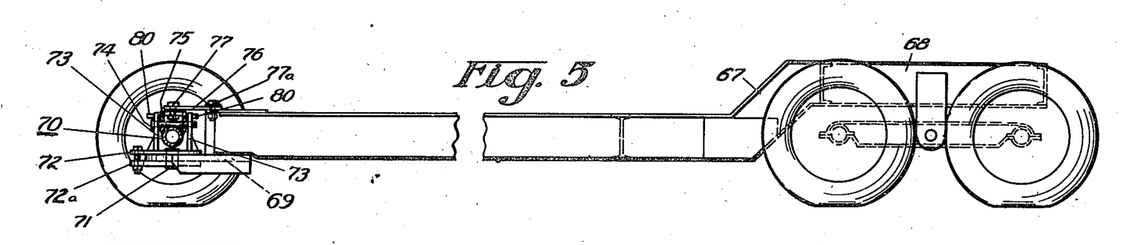
Figure 5 is a view, partly in side elevation and partly in section, illustrating another form of my invention in which the front wheels may be removed to permit loading of the trailer from the front.
Figures 6, 7, 8:
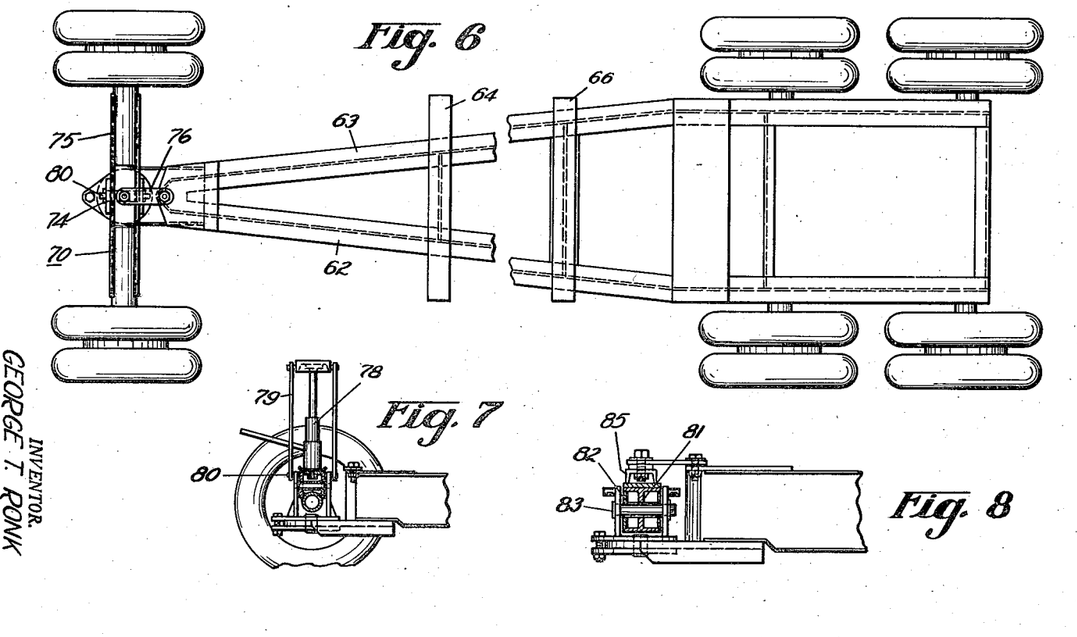
Figure 6 is a plan view of the trailer shown in Figure 5.
Figure 7 is a fragmentary view, partly in elevation and partly in section, showing how the frame, illustrated in Figures 5 and 6, is lowered and raised from the axle by means of a jack and special saddle structure.
Figure 8 is a fragmentary view in side elevation and partly in section illustrating a modified form of the device shown in Figures 5, 6 and 7 and in which a square fabricated type of axle is employed.

The front end of the platform is supported generally by means of the heavy plate 69 which is welded or otherwise fastened to the bottom side of the frame members so as to be below the supporting axle 70, and is thus in such a position that the front end of the platform may be readily dropped vertically from the axle by lifting means supported on the axle, to permit the front axle to be removed during loading and unloading.

The supporting plate 69 extends forwardly beyond the frame members and is preferably made semi-circular in shape at its forward end. A heavy pivot pin 71 is mounted for free rotation in a hole extending through this plate and heavy annular retainer plates 72 and 72a are affixed to this pivot pin by welding or the like on opposite sides of the supporting plate 69. The uppermost of these annular plates 72 is provided with a pair of spaced uprights 73—73 through which an axle pin 74 is removably received.

The tubular axle 70 shown in Figure 5 is provided with longitudinally extending reinforcing members, and a plate-like top, as shown at 75, and the entire axle structure is mounted for free movement on the axle pin 74. A hammerstrap or tie member 76 is pivotally and removably attached to the axle, as at 77, and loosely attached to the frame, as at 77a.

When it is desired to load or unload the frame, the hammerstrap is removed, a jack 78 is positioned on the axle, hanger straps 79 are attached to the jack, as shown in Figure 7, and also to a pair of stud pins 80—80 secured to the uprights 73. The jack is operated to permit the removal of the axle pin 74 after which the jack may be further operated to lower the frame to the ground.

In the modified form of axle structure shown in Figure 8, the axle is fabricated of an I beam section 81 with reinforcing side plates 82 and a channel reinforcing member 85, all preferably joined together by welding. The entire axle is pivotally mounted on an axle pin 83 as before described.

These structures permit substantially free universal action of the front axle to permit the wheels to adapt themselves to an uneven roadway.

Figures 9, 15:
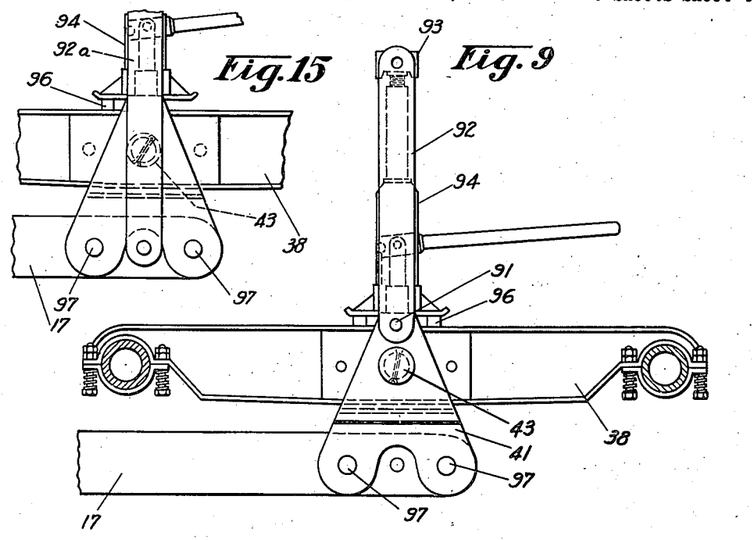
Figure 9 is a fragmentary view, partly in section and partly in elevation, illustrating how the truck of the device shown in Figures 1, 2, 3 and 4 is engaged with the rear end of the trailer and the means used for raising and lowering same.
Figure 15 is a fragmentary view in elevation illustrating a modified form of the device shown in Figure 9 for raising and lowering the rear end of the trailer frame.

In Figure 9, I have illustrated in greater detail, the truck and axle structure of Figures 1, 2, 3 and 4, and have shown particularly the means for raising and lowering the rear end of the frame vertically and for attaching the frame to the equalizers of the tandem axle structure.

It is to be noted that the brackets 41 and 42 are provided with stud pins 91 to which links 92 may be attached. The links 92 are joined at their upper ends by means of a jack head 93 and the rear end of the frame is raised and lowered by means of any suitable jacks, such as the hydraulic jack 94 shown. I preferably utilize two of the structures including two jacks for raising and lowering the rear end of the frame, since by the use of two jacks, better control is afforded. The base of the jack 94 is received either on the equalizers 38 or 39 or platforms on these equalizers, such as the base plates 96.

In operation, in dropping the rear end of the frame, it is only necessary to place the links 92 and jack head 93 and jack 94 in place and apply sufficient pressure on the jack to release the pin 43. The pin is withdrawn and the jack lowered to let the rear end of the frame down to the ground. The brackets remain attached to the lever arms 17 and the truck may be rolled back out of the way, as illustrated in Figure 1. The brackets may be removed from the lever arms, if desired, by removing the pins 97.

In Figure 15 I have illustrated a slightly modified form of the structure shown in Figure 9 in which the links 92 are extended down to the lever arms 17, as illustrated at 92a, without the use of the pin 91. By the use of this device the brackets 41 may be disengaged from the lever arms 17 by removal of the pins 97 as soon as sufficient pressure has been applied to the jacks. The brackets then remain on the equalizers, as illustrated in Figure 1.

Figures 10, 11:
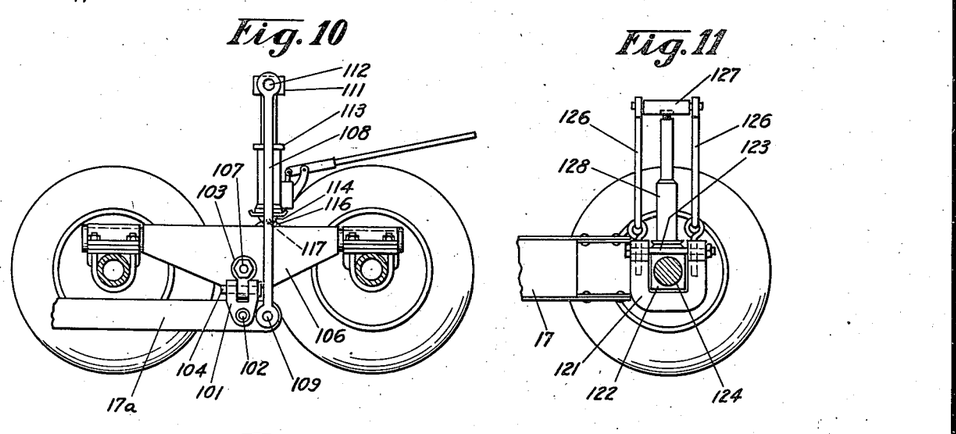
Figure 10 is a partial view partly in section and partly in elevation illustrating a modified form of truck and connection for the rear end of a trailer such as shown in Figures 1, 2, 3 and 4 and illustrating how this truck may be disconnected and connected to the rear end of the trailer.
Figure 11 is a fragmentary view, partly in section and partly in elevation, of still another form of rear axle structure in which a single axle is used, illustrating how the rear end of the trailer may be raised or lowered.

In the form of the invention shown in Figure 10, the structure, in operation, is substantially the same except that the point of application of the raising and lowering force is applied at a position to the rear of the connection between the equalizer bar and the lever arms and does not use the truck fastening means as a portion of the raising and lowering mechanism. In this structure a modified form of suspension of the equalizers is likewise shown. In this device a clevis-like bracket 101 is secured to each lever arm 17a by means of pins 102. A clevis-like member 103 at right angles to the bracket member 101 has a pinned connection, illustrated at 104, with the bracket 101 and is also pivotally connected to the equalizer 106 by means of the bolt 107. The links for raising and lowering the rear end of the frame are illustrated at 108, and these links are pivotally attached to the rear end of the frame by the removable pins 109 and to the jack head 111 by means of pins 112. The jack 113 is of any suitable type. In this form of the invention, the base of the jack is provided with ears 114 which are received in cup-like members 116 attached to the equalizers 106. A pinned connection is provided between these members 114 and 116, as illustrated at 117, and the jack may thus pivot forward and back in direct line with the load being lifted.

Figure 12:
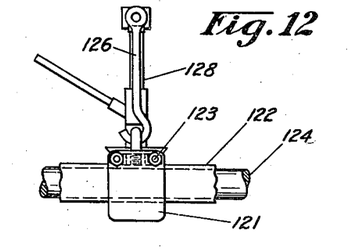
Figure 12 is a fragmentary view, in rear elevation, of the means for raising and lowering the rear end of a trailer as shown in Figure 11.

In Figures 11 and 12 I have illustrated another form of connection between the rear end of the platform and the supporting wheels and one which is particularly adapted for use with simple axles rather than the equalizers shown in Figures 9 and 10.

In this form of the device, the lever arms 17 terminate in U-shaped members 121 which extend beneath the squared axle bearing 122 and up on either side thereof. The upper ends of the U-shaped members 121 may be joined by means of bolts 123 which hold the bearings and thus the axle 124 in place, to thus carry the load and prevent rotation of the axle. The lever arms 17 and the rear end of the platform are raised and lowered vertically by means of links 126, jack head 127, and a jack 128 in the manner hereinbefore described.

Figure 12 is a fragmentary elevational view of the device shown in Figure 11, showing how the connection appears when viewed from the rear.

My method of loading and unloading may be applied to trucks utilizing springs for supporting the load as well as to the axles without spring supports. One means of applying the raising and lowering mechanism to spring supported loads is illustrated in Figures 13 and 14.

Figure 13:
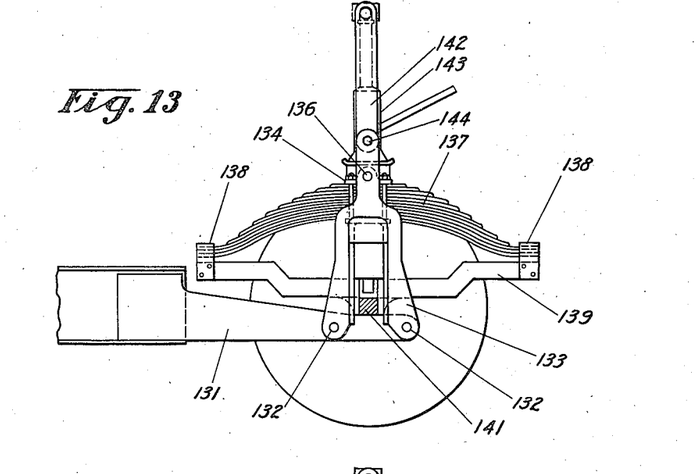
Figure 13 is a fragmentary view, partly in section and partly in elevation, illustrating substantially the same axle structure as shown in Figures 11 and 12 but in which leaf springs are utilized in supporting the load, and the figure illustrates particularly how the frame may be raised and lowered when utilizing an axle structure of this character.

In Figure 13, the platform terminates, as before described, in lever arms 131. These lever arms are secured by means of pins 132 to upwardly extending U-brackets 133. These brackets, in turn, are pivotally engaged to spring clamp members 134 by means of pin connections 136. The leaf springs 137 are of course secured at their middle portions by the spring clamps 134 and are loosely received in U-shaped support and guide members 138 attached at the opposite ends of the spring support bars 139. These spring support bars are then in turn fixedly secured to the axle 141. The axle may thus move up and down in the guide afforded by the brackets 133 and will bottom against the lever arms 131. In raising and lowering the lever arms 131 and thus the rear end of the platform, I provide links 142 and jacks 143. The links 142 are removably engaged to the upper part of the brackets 133 by means of the pins 144. Raising and lowering the rear end of the platform is accomplished in the same manner as in the previous embodiments of the invention.

Figure 14:
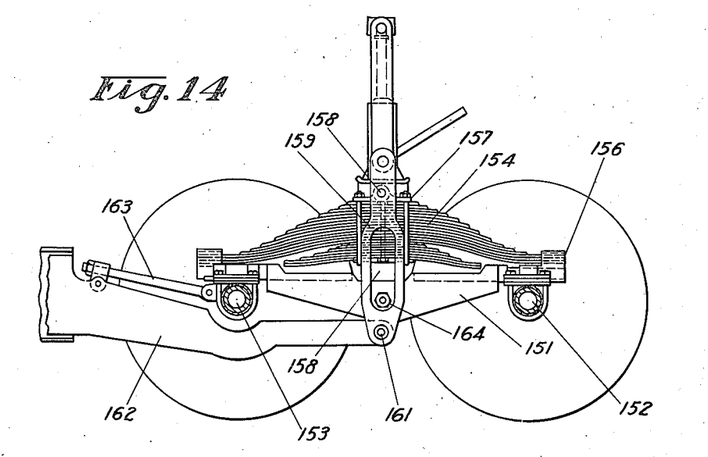
Figure 14 is a fragmentary view, partly in elevation and partly in section, illustrating how a similar raising and lowering means may be applied to a double-axle truck having spring suspension such as shown in Figure 9.

In Figure 14 I have illustrated a means and method for attaching and raising and lowering a platform on another form of truck structure. The truck structure here shown has equalizers 151 which are pivotally attached to the tandem axles 152 and 153 near their ends, and leaf springs 154 which are loosely received in inverted U-shaped clip members or spring retainer guides 156. The leaves of the springs are clamped together by means of clamps 157 and the upper portion of each clamping means is provided with a pin 158 which is received in openings in the upper ends of brackets 159. These brackets 159 are pivotally attached by means of pins 161 to the rear ends of the lever arms 162. Torque or draft bars 163 extend from the forward axles or the forward ends of the equalizers to the frame and the equalizer bars are connected by a cross shaft 164. The slots in the brackets 159 are merely to accommodate this cross shaft.

It is apparent, then, that my method of loading, carrying and unloading heavy loads, may be applied to any form of platform structure. I may load over the front end or over the rear, employing my principles. The means for raising and lowering the front or the rear of the platform or frame members, as desired, may be applied to any of the existing or any other form of axle structure or multiple axle structure with or without spring supports.

The platform, in its lowered position, affords an extremely easy means of loading and unloading, and the platform itself provides a ramp for the purpose, if desired, with a minimum amount of additional equipment. Raising and lowering the rear or front of the platform is accomplished by an extremely simple structure, and parts which are available anywhere.

By means of my invention, standard forms of wheels, tires, and front jacks may be employed, which is of material importance in securing high operating efficiency at low cost. My invention affords a novel and economic means and method for the transportation of heavy loads.

Although I have described several embodiments of my invention, it is apparent that modifications thereof may be made by those skilled in the art. Such modifications may be made without departing from the spirit and scope of my invention as set forth in the appended claims.

I claim as my invention:

1. In an underhung trailer, a frame, removable tandem axles, equalizing means for connecting said axles in tandem, means for pivotally suspending the frame from the equalizing means, jack means mounted on said equalizing means substantially normal to the longitudinal axis thereof, and link means operatively connecting the jack means and the frame for lowering the frame from the equalizing means.

2. In an underhung trailer of the type having wheels and braking mechanism therefor, a frame, removable tandem axles receiving said wheels, said frame being adapted to extend under said axles, means for lowering the trailer frame for disconnecting the axles, equalizing means for connecting the said axles in tandem and pivotally suspending said frame when in raised position, and compensating means disposed between said equalizing means above said frame and connecting said axles so as to compensate for torque set up in said tandem axles when brakes are applied.

3. In an underhung trailer, a frame, removable tandem axles, equalizing means for suspending said frame from said axles for proper distribution of the load on wheels supporting the said axles, and means including jacks mounted on said equalizing means substantially normal to the longitudinal axis thereof and links operatively connecting the said jacks and frame for lifting and lowering said frame relative to the said equalizer members.

4. In an underhung trailer, a frame, a wheel truck, means for supporting one end of the frame on said truck including vertically positioned supporting links, means for attaching same to the truck and to the frame, at least one of said attaching means comprising pivoted means, draft bars also connecting said truck and frame, and means for raising and lowering the frame relative to the wheel truck, including jack means supported by the wheel truck and link means connecting the jack and the frame.

5. In a trailer, a wheel truck including an axle, a trailer frame having a coupling portion thereof adapted to underlie the said axle, a swivel member mounted for pivotal movement on the said underlying coupling portion of the frame and about a substantially vertical axis, axle engagement means extending upwardly from the said swivel means adjacent the axle, means for pivotally securing the axle to the said axle engagement means for pivotal movement about a substantial horizontal axis transverse to the axle, and means for lifting and lowering the frame relative to the axle including jack means disposed substantially above the axle, and link means operatively connecting the jack means and the axle engagement means.

6. In a trailer, a frame, a wheel truck, the frame having a portion thereof adapted to underlie said wheel truck, detachable means for operatively attaching together the said underlying means and the wheel truck, the connection with at least one of said members being pivotal, jack means disposed for movement in a substantially vertical plane and substantially above the said connecting means and adapted to be supported by said wheel truck in substantially fixed relation thereto, and lifting links disposed substantially in parallelism with the axis of the said jack means and adapted to operatively connect the said jack means and the said underlying portion of the frame.

7. In a trailer, a wheel truck, a frame having a portion thereof adapted to underlie the said wheel truck, supporting means, means for operatively securing said supporting means to the underlying portion of the frame and to the wheel truck, at least one of said securing means including a pivotal connection, jack means adapted to be supported in substantially fixed relation to the wheel truck and substantially vertical relative to the said pivotal connecting means, and lifting links adapted to be interposed between said underlying portion of the frame and the jack means for operatively connecting said members for lifting and lowering said frame member vertically relative to said wheel truck.

8. In a trailer, a wheel truck, a frame, said frame having a portion thereof adapted to underlie said wheel truck, supporting means extending upwardly from said underlying portion of said frame adjacent the sides of said wheel truck, the said supporting means being pivotally connected at the top thereof to the said wheel truck, jack means supported by said wheel truck in substantially vertical position, and lifting links operatively connecting said underlying portion of the frame and said jack means, the said supporting means adapted to guide the said underlying portion of said frame in a plane normal to the longitudinal axis of the frame when lifted by said jack means.

9. In a trailer, a main frame, a wheel truck, the frame having an extension adapted to underlie the said wheel truck, supporting means including a swivel plate pivotally secured to the underlying portion of the frame, at least one upright plate mounted on the said swivel plate and extending upwardly adjacent the side of said wheel truck, a substantially horizontally disposed pivotal connecting member for securing said upright plate to said wheel truck, a removable draft bar pivotally secured between the said frame and said wheel truck, a lifting jack adapted to be removably supported by the said wheel truck in substantially vertical position and in vertical alignment with said pivotal connecting member, and lifting links adapted to be operatively engaged between the said lifting jack and said supporting means whereby the said underlying portion of the frame may be lifted by means of the jack and lifting links and guided by the supporting means while being lifted.

10. In a trailer of the character described adapted for moving heavy machinery and the like, a trailer body adapted to be connected to a motor vehicle at its forward end, a removable wheel assembly for normally supporting the rear end of said trailer body in a raised position above the ground, and lifting and lowering means including a jack and a jack operated member carried by said wheel assembly and removable therewith, said last named means providing for lifting and lowering said rear end of the trailer body with respect to said wheel assembly.

11. In a trailer of the character described adapted for moving heavy machinery and the like, a trailer body adapted to be connected to a motor vehicle at its forward end, detachable wheeled supporting means for normally supporting the rear end of said trailer body in a raised position above the ground, and mechanism carried by said detachable supporting means for effecting lowering of said rear end of the body into supporting engagement with respect to the ground and lifting of said end from said lowered position to said raised position.

12. In a trailer of the character described adapted for moving heavy machinery and the like, a trailer body adapted to be connected to a motor vehicle at its forward end, a unitary truck assembly having a plurality of wheels mounted therein for normally supporting the rear end of said trailer body in a raised position above the ground hydraulic means mounted on said truck assembly and providing for lowering said rear end of the trailer body for support from the ground and for raising said end from said lowered position to said raised position, and detachable connecting means between said hydraulic means and said body providing for detaching and removing said truck assembly and said hydraulic means from the trailer body when said rear end is in lowered position.

13. In a trailer of the character described adapted for moving heavy machinery and the like, a trailer body adapted to be connected to a motor vehicle at its forward end, a removable wheel assembly for normally supporting the rear end of said trailer body in a raised position above the ground, lifting and lowering mechanism for the rear end of the trailer body carried by said wheel assembly and removable therewith, and means for disconnecting said wheel assembly from the trailer body upon lowering of said rear end, said lifting and lowering mechanism comprising a supporting member mounted on said truck assembly, a hydraulic jack mounted on said supporting member, a jack operated rod extending downwardly adjacent said supporting member for attachment with said trailer body, said rod being movable upwardly and downwardly under action of said jack to effect lowering and lifting of said rear end of the trailer body with respect to the ground, and a detachable connection between the lower end of said rod and said trailer body.

14. In a low platform trailer, a frame, a fifth wheel king-pin near the forward end adapted for use with a fifth wheel supporting structure, a supporting axle near the rear end, and means comprising jack means supported in vertical position and centered above the supporting axle and laterally spaced generally vertically extending links operatively connecting the jack and frame positioned in the vertical transverse plane formed by the jack means and the axle for lowering the rear end of the trailer frame vertically from the supporting axle, to permit said lowered frame to be used as a loading ramp, when the said rear axle has been rolled away.

15. In a trailer of the character described adapted for moving heavy machinery and the like, a trailer body adapted to be connected to a motor vehicle at its forward end, a removable wheel assembly for normally supporting the rear end of said trailer body in a raised position above the ground, lifting and lowering mechanism for the rear end of the trailer body carried by said wheel assembly, and removable therewith, and means for disconnecting said wheel assembly from the trailer body upon lowering of said rear end, said lifting and lowering mechanism comprising a hydraulic jack, a jack operated link extending downwardly for attachment with said trailer body, said link being movable upwardly and downwardly under action of said jack to effect lifting and lowering of said rear end of the trailer body with respect to the ground, and means providing a detachable connection between said link and said trailer body.

16. In a trailer of the character described adapted for moving heavy machinery and the like, a trailer body adapted to be connected to a motor vehicle at its forward end, a removable truck assembly for normally supporting the rear end of said trailer body in a raised position above the ground and comprising a pair of wheel axles mounted in tandem and a pair of spaced equalizer members interconnecting said axles, and lifting and lowering means including jack means supported by said equalizer members intermediate said tandem axles and removable with said truck assembly, said lifting and lowering means providing for lifting and lowering said rear end of the trailer body with respect to said truck assembly.

17. In a trailer of the character described adapted for moving heavy machinery and the like, a trailer body adapted to be connected to a motor vehicle at its forward end, a removable wheel assembly for normally supporting the rear end of said trailer body in a raised position above the ground, lifting and lowering means including a jack carried by said wheel assembly and removable therewith, said last named means providing for lifting and lowering said rear end of the trailer body with respect to said wheel assembly, means detachably connecting said wheel assembly to said trailer body, and draft bars also connecting said wheel assembly and said trailer body.

18. In a trailer or the like adapted for moving heavy machinery or the like, a trailer body adapted to be connected to a motor vehicle, a removable wheel assembly including axle means adapted to straddle and be disposed over a portion of one end of said trailer, means carried by said axle means and adapted to be engaged with said end of the trailer for raising it relative to said wheel assembly, and means connecting said trailer end to said axle assembly separate from said raising means.

19. In a trailer or the like adapted to be connected at one end to a motor vehicle or the like, a pair of generally laterally spaced arms at the other end of said trailer, a detachable wheel assembly adapted to straddle said arms when they are on the ground, means for raising said arms, and means for pivotally connecting said arms, after they have been raised, with said wheel assembly so as to support the other end of the trailer on said wheel assembly.

20. The invention set forth in claim 19, further characterized by said pivotally connecting means comprising a bracket fixed to each arm and extending upwardly, and removable pivot pin means connecting each bracket to said wheel assembly.

21. In a trailer or the like for moving heavy machinery or the like, a trailer body adapted to be connected at one end to a motor vehicle or the like, a removable wheel assembly adapted to straddle a portion of the other end of said trailer body and including axle means, means adapted to react against said wheel assembly for raising said other end of the trailer body from a position in which it is resting on the ground or other support, and means for pivotally connecting said other end of the trailer body to said wheel assembly after it has been raised up into position relative to said wheel assembly.

GEORGE T. RONK.

REFERENCES CITED

The following references are of record in the file of this patent:

UNITED STATES PATENTS

| Number | Name | Date |
|---|---|---|
| 1,693,869 | Ronk | Dec. 4, 1928 |
| 1,874,558 | Lotte | Aug. 30, 1932 |
| 2,029,439 | Kohl | Feb. 4, 1936 |
| 1,628,084 | Walch | May 10, 1927 |
| 2,058,955 | Culemeyer | Oct. 27, 1936 |
| 2,131,949 | Helmig | Oct. 4, 1938 |
| 1,565,527 | Templin | Dec. 15, 1925 |
| 1,739,364 | Lake | Dec. 10, 1929 |
| 2,094,836 | Clark | Oct. 5, 1937 |

FOREIGN PATENTS

| Number | Country | Date |
|---|---|---|
| 473,690 | German | Mar. 19, 1929 |
| 284,548 | British | Feb. 2, 1928 |
| 469,134 | British | July 20, 1937 |
| 477,423 | British | Dec. 30, 1937 |